United States Patent [19]

Aufrere et al.

[11] Patent Number: 5,645,316
[45] Date of Patent: Jul. 8, 1997

[54] VEHICLE SEATBACK FRAME, AND A SEAT INCLUDING SUCH A FRAME

[75] Inventors: Christophe Aufrere, Marcoussis; Bruno Hamelin, Combs la Ville, both of France

[73] Assignee: Bertrand Faure Equipements SA, France

[21] Appl. No.: 674,508

[22] Filed: Jul. 2, 1996

[30] Foreign Application Priority Data

Jul. 3, 1995 [FR] France ................ 95 07992

[51] Int. Cl.$^6$ .............................. B60N 2/42; B60R 21/00
[52] U.S. Cl. .................. 297/216.13; 297/452.2; 297/471; 297/483; 297/472
[58] Field of Search ............... 297/216.13, 452.18, 297/452.2, 470, 471, 472, 483, 216.1

[56] References Cited

U.S. PATENT DOCUMENTS

| | | | |
|---|---|---|---|
| 3,429,613 | 2/1969 | Rice | 297/472 |
| 4,076,306 | 2/1978 | Satzinger | 297/216.13 |
| 4,192,545 | 3/1980 | Higuchi et al. | 297/216.13 |
| 4,626,028 | 12/1986 | Hatsutta et al. | |
| 4,804,226 | 2/1989 | Schmale | 297/216.13 |
| 5,468,053 | 11/1995 | Thompson et al. | 297/452.18 |

FOREIGN PATENT DOCUMENTS

| | | |
|---|---|---|
| 0353210 | 1/1990 | European Pat. Off. . |
| 0505229 | 9/1992 | European Pat. Off. . |
| 2714340 | 12/1993 | France . |
| 3328825 | 2/1985 | Germany ............. 297/470 |
| 3706394 | 5/1988 | Germany . |
| 4285506 | 10/1992 | Japan ............... 297/483 |

OTHER PUBLICATIONS 60-113742—Jun. 20, 1985—JP—Abstract Only.

60-135339—Jul. 18, 1985—JP—Abstract Only.

Le Journal de l'Automobile No. 483/484; Apr. 28, 1995.

*Primary Examiner*—Peter M. Cuomo
*Assistant Examiner*—Anthony D. Barfield
*Attorney, Agent, or Firm*—Larson and Taylor

[57] ABSTRACT

The invention relates to a seatback frame for a vehicle seat, comprising a lower structure provided with two side uprights, and an upper structure provided with a horizontal torsion bar surmounted by an arch. The first end of the torsion bar is prevented from rotating relative to one of the two uprights of the lower structure and is secured to one end of the arch. The second end of the torsion bar is mounted to pivot freely relative to the other side upright of the lower structure, while being secured to the other end of the arch. A seat belt is mechanically connected to the arch of the upper structure, with said upper structure being dimensioned so as to deform plastically when the seat belt is subjected to a traction force.

7 Claims, 2 Drawing Sheets

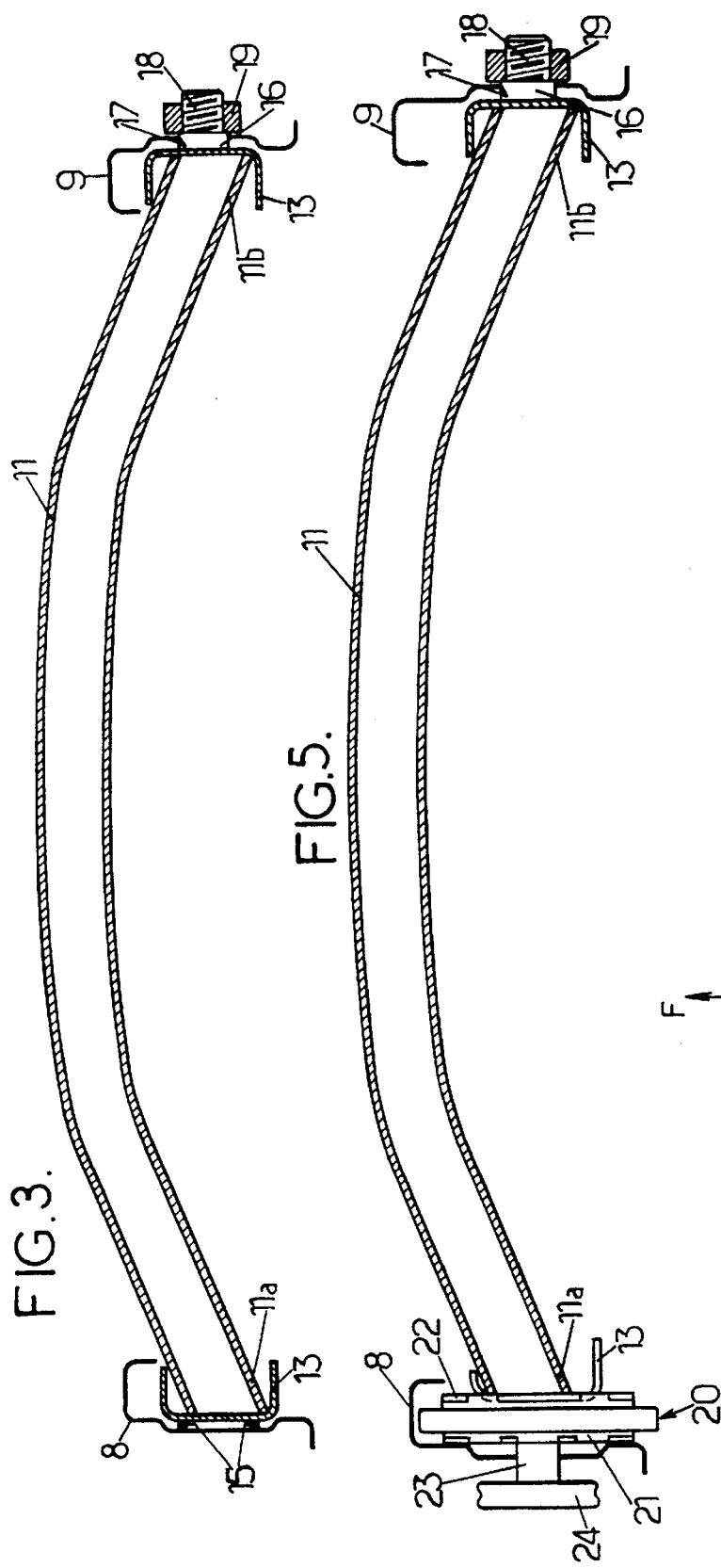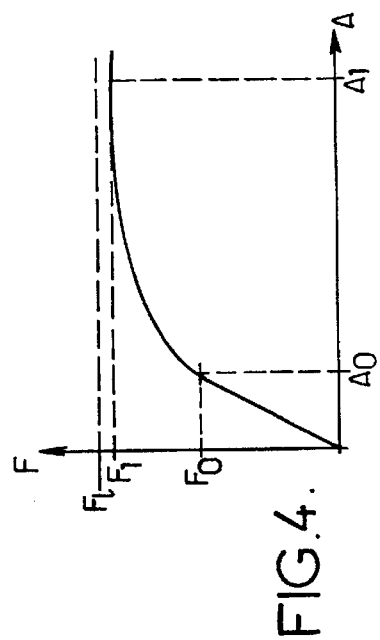

VEHICLE SEATBACK FRAME, AND A SEAT INCLUDING SUCH A FRAME

FIELD OF THE INVENTION

The present invention relates to vehicle seatback frames, and to vehicle seats including such frames.

More particular, the invention relates to a vehicle seatback frame having a top portion in mechanical connection with a seat belt for safety purposes. The mechanical connection in question may possibly consist in one end of the seat belt being fixed directly to the seatback, however it more commonly consists in a sliding connection such that during normal use of the vehicle, the seat belt is allowed to slide freely, with its end being wound up on a belt winder.

A seat fitted with such a seatback frame is generally referred to as a "seat with a built-in belt".

BACKGROUND OF THE INVENTION

When a vehicle having such a seat installed therein is subjected to a front impact, the seat belt applies a large force to the torso of the seat user, to such an extent that the seat belt is in danger of injuring the user.

Naturally, the same phenomenon exists when the seat belt is not "built in" the seat, but is secured to the bodywork of the vehicle.

However, in that case, it is known that the phenomenon can be remedied by fixing the anchor points of the seat belt to sheet metal that is tearable, as described, for example, in an article published in the journal "Le Journal de l'Automobile" (No. 483/484 of Apr. 28, 1995, page 8). Thus, when the vehicle is subjected to a front impact, the sheet metal tears progressively under traction force from the seat belt, enabling the anchor point of the belt to move over a certain distance, which may be as much as 30 cm, for example. In this way, the movement of the user's torso in a forward direction is braked progressively, thereby putting a limit on the forces exerted by the seat belt on the user's torso. This avoids injuring the user.

When the seat belt is "built in" the seat, the above technical solution is inapplicable. The space available inside the seat is too restricted to enable one of the anchor points of the seat belt, as incorporated in the seat, to be subjected to linear displacement of significant magnitude, e.g. about 30 cm.

OBJECT AND BRIEF SUMMARY OF THE INVENTION

An object of the present invention is thus to propose a vehicle seatback frame of the type that has a "built-in" belt that enables the forces applied by the seat belt to the torso of the seat user to be kept within limits in the event of an accident.

According to the invention, a seatback frame of the kind in question comprises an upper structure mounted on a lower structure, the lower structure having at least first and second substantially vertical side uprights, the upper structure comprising both a horizontal torsion bar extending longitudinally between first and second ends respectively mounted on the first and second side uprights of the lower structure, and secondly a superstructure which is disposed above the torsion bar and which is secured at least to the second end of the torsion bar, the first end of the torsion bar being prevented from rotating relative to the first upright of the lower structure, and the second end of the torsion bar pivoting freely relative to the second upright of the lower structure, the superstructure of the upper structure comprising a portion situated adjacent to the second upright of the lower structure, the seat belt being mechanically connected with said portion of the superstructure and applying a rotary torque to said portion of the superstructure when said seat belt is itself subjected to a traction force, the torsion bar and the superstructure being dimensioned so as to deform plastically when the seat belt is subjected to a traction force exceeding a predetermined value, and the upper structure then exerting a resistive force on the seat belt of less than 3,500N.

Thus, in the event of the vehicle being subjected to an impact, because the torsion bar and the superstructure deform plastically, the torso of the seat user is braked progressively. In this way, the force applied by the belt to the torso of the seat user is restricted to a value that ensures that the user does not run any risk of being injured.

In preferred embodiments, use is made of one or more of the following dispositions:

- the seat belt is wound, at least in part, on a belt winder;
- the torsion bar of the upper structure is tubular in section, thus enabling it to be simultaneously light in weight and strong in torsion;
- the superstructure of the upper structure comprises an arch having a top cross-member and two side branches which extend downwards from the top cross-member, to bottom ends which are secured to the two respective ends of the torsion bar;
- the first end of the torsion bar is rigidly fixed in permanent manner to the first upright of the lower structure; and
- the lower structure extends to a top end and the superstructure of the upper structure extends upwards beyond said top end, said superstructure extending horizontally over substantially the entire width of the seatback frame, and the first end of the torsion bar being prevented from rotating relative to the first upright of the lower structure by means of a hinge mechanism for adjusting the inclination of the upper structure relative to the lower structure: this particular way of assembling the upper structure to the lower structure thus makes it possible not only to ensure better safety, but also to obtain greater comfort by allowing the inclination of the top portion of the seatback to be adjusted.

In addition, the invention also provides a vehicle seat including a seatback provided with a frame as defined above, the seat belt of the seat having a plurality of anchor points with all of the anchor points of said belt being secured to the seat.

BRIEF DESCRIPTION OF THE DRAWINGS

Other characteristics and advantages of the invention appear from the following detailed description of two embodiments given as non-limiting examples, and described with reference to the accompanying drawings.

In the drawings:

FIG. 3 is a section view through the torsion bar of the upper structure of the seatback frame shown in FIG. 1;

FIG. 4 is a graph showing the resistive force of the upper structure of the seatback frame of the invention as a function of the deformation of said upper structure; and FIG. 5 is a view similar to FIG. 3, showing another embodiment of the invention that includes means for adjusting the inclination of the top of the seatback.

MORE DETAILED DESCRIPTION

In the various figures, the same references are used to designate elements that are identical or similar.

Figure 1:
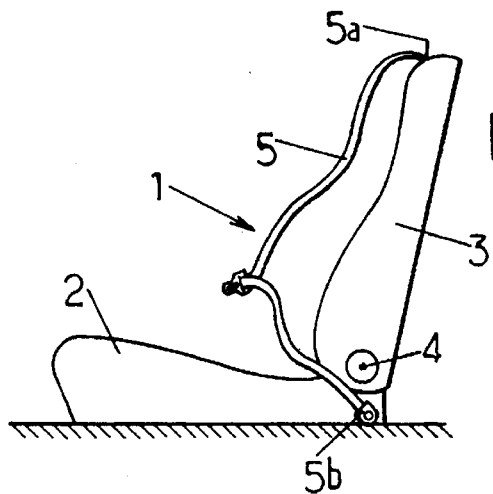
FIG. 1 is a diagrammatic view of a vehicle seat including a seatback frame constituting an embodiment of the invention.

FIG. 1 shows a motor vehicle front seat 1 having a seatback frame of the invention. The seat comprises firstly a seat proper 2 which is mounted on the floor of the vehicle, in general via slideways, and secondly a seat back 3 which is generally pivotally mounted relative to the seat proper 2, about an axis of rotation 4.

The seat 1 has a "built-in" seat belt 5, i.e. a belt for which all three anchor points are fixed to the seat itself. In FIG. 1, there can be seen only the top anchor point 5a and the bottom anchor point 5b which is permanently connected to the belt. The third anchor point, enabling the belt to be buckled, is situated on the side of the seat that is not shown in FIG. 1.

The top anchor point 5a is a point through which the seat belt passes, which belt is wound up on a belt winder situated inside the seat 1.

Figure 2:
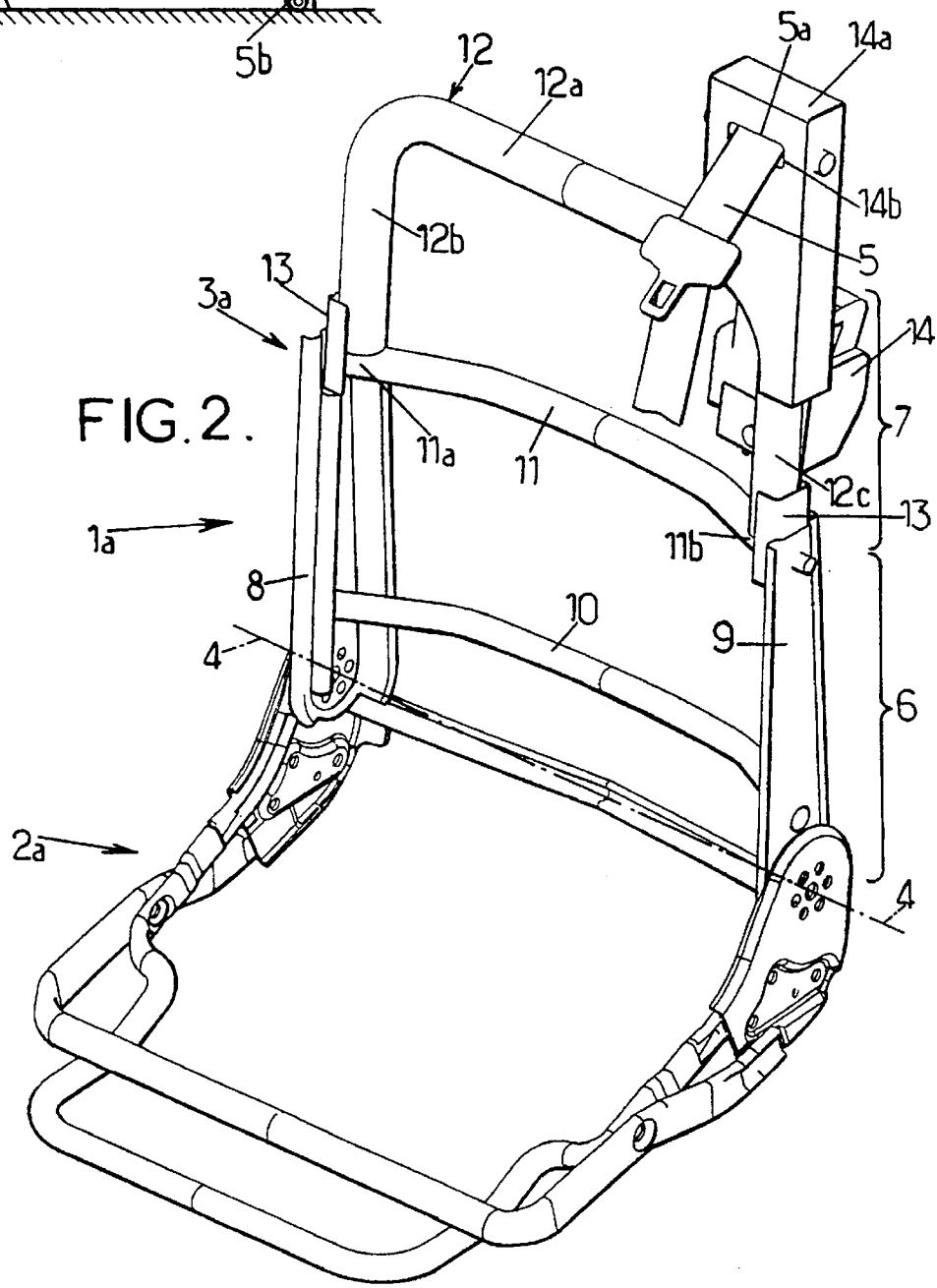
FIG. 2 is a perspective view of the frame of the FIG. 1 seat.

As shown in FIG. 2, the seat has a metal frame 1a that is generally made of steel. This frame comprises a frame 2a for the seat proper and a seatback frame 3a which is pivotally mounted on the frame 2a for the seat proper about the above-mentioned axis 4.

The seatback frame 3 is itself subdivided into a lower structure 6 and an upper structure 7.

The lower structure 6 has first and second substantially vertical lateral uprights 8 and 9 which pivot about the axis 4 at their bottom ends, and which are interconnected by a cross-member 10.

The upper structure 7 comprise a torsion bar 11 and an arch 12 disposed above the torsion bar, with each of these two parts being tubular in section.

The torsion bar 11 extends substantially horizontally between first and second axial ends 11a and 11b which are adjacent to the top ends of the first and second side uprights 8 and 9 respectively of the lower structure.

Also, the arch 12 is preferably, although not necessarily, constituted by a single length of bent tubing comprising a top horizontal cross-member 12a and two side branches 12b and 12c. The two branches 12b and 12c extend downwards from the cross-member 12a as far as the bottom ends which are secured to respective axial ends 11a and 11b of the torsion bar.

The bottom ends of the side branches 12b and 12c of the arch are secured to the axial ends 11a and 11b of the torsion bar in any appropriate manner. By way of example, this may be done by metal channel-section lengths 13 which are welded both to the side branches 12b and 12c and to the axial ends 11a and 11b of the torsion bar.

Also, a belt wind-up device 14 housed inside the seatback 3 is provided for winding up the belt 5 and is fixed to the arch 12 adjacent to the second side upright 9 of the lower structure. This wind-up device 14 is of the type that enables the belt to be braked in the event of sudden traction being applied to the belt, in a manner that is well known in the state of the art.

In the example shown, the upper structure 7 also has a rigid box 14a secured to the arch 12 and extending upwards from the cross-member 12a, higher than the winder 14. This box 14a has a horizontal slot 14b facing towards the front for receiving the belt 5, and it includes a deflector pulley (not shown) over which the belt 5 passes before meeting the winder 14. The back face of the box 14a is open, at least in part, to allow the seat belt to pass onto the winder 14.

The above-mentioned top "anchor point" 5a of the seat belt is thus constituted by the box 14a.

As shown in FIG. 3, the first end 11a of the torsion bar 11 is secured to the first side upright 8 of the lower structure. In the example shown, which example is not limiting, this is done by means of welds 15 between the first side upright 8 and the section member 13 corresponding to the first end 11a of the torsion bar. Optionally, the first end 11a of the torsion bar can pass through the corresponding section member 13 so as to be welded directly to the first side upright 8.

Also, the second end 11b of the torsion bar is mounted to pivot freely at the top end of the second side upright 9 of the lower structure.

For this purpose, in the example shown, the section member 13 which is fixed to the second end 11b of the torsion bar is secured to a pivot 16 passing through a circular opening 17 formed in the second side upright 9. The pivot 16 may also be fixed directly to the second end 11b of the torsion bar, and pass through the section member 13. The pivot 16 is extended towards the outside of the seat by a threaded rod 18 which receives a nut 19. The nut 19 does not clamp the second upright 9 so the pivot 16 can pivot freely in the circular opening 17 while nevertheless securing the torsion bar 11 axially relative to the second side upright 9.

By means of these dispositions, when the seat belt 5 is subjected to a traction force, it exerts twisting on the torsion bar 11 and both bending and twisting on the arch 12.

So long as the traction to which the seat belt 5 is subjected does not exceed a predetermined threshold F0, the upper structure 7 remains substantially undeformable: in other words, as shown in FIG. 4, the displacement A0 to which the top anchor point 5a of the belt is subjected is negligible and the upper structure is subjected to deformation that is small only, and thus elastic.

In contrast, when the traction force exceeds the threshold F0, it gives rise to plastic twisting deformation of the torsion bar 11 and to plastic twisting and bending deformation of the arch 12.

By way of example, the threshold F0 may be about 2,500N.

Because of the above-mentioned plastic deformation, the top anchor point 5a of the seat belt is subjected to linear displacement A. As shown in FIG. 4, the torsion bar 11 and the arch 12 are dimensioned so that during said linear displacement A, and in particular for a predetermined value A1 of said linear displacement, the resistive force F1 applied by the upper structure 7 to the seat belt 5 always lies at a level that is below a predetermined limit force F1 that is small enough to ensure that the seat user is not injured by the seat belt.

The predetermined displacement A1 may, for example, be 300 mm, even though this value is not limiting in any way, and the force F1 may be equal to 3,500N, for example.

In the embodiment shown in FIG. 5, the seatback frame 2a differs from the above-described embodiment solely by the fact that the first end 11a of the torsion bar is prevented from rotating relative to the first side upright 8 of the lower structure by means of a hinge mechanism 20, as is well known in the state of the art.

One example of such a hinge mechanism 20 is given, for example, in document EP-A-0 505 229, which example is naturally not limiting in any way.

In the example under consideration, the hinge mechanism 20 comprises:

- a stationary side plate 21 secured to the first side upright 8 of the lower structure;
- a moving side plate 22 secured to the first end 11a of the torsion bar, with this being done in the example under consideration by means of one of the two above-described section members 13; and
- a rotary control shaft 23 driven by a control knob 24 or optionally driven by an electric motor (not shown), the moving side plate 22 being rotated by the control shaft 23 by means of a hypocyclic gear train.

In a variant, the mechanism 20 need not include a gear train. In which case, the control shaft 23 can only lock or unlock the moving side plate 22, and the control shaft is always driven manually by means of a knob.

The axis of rotation of the moving side plate 22 is in alignment with the axis of rotation of the pivot 16 secured to the second end 11b of the torsion bar, such that by rotating the control knob 24, the entire upper structure 7 of the seatback frame is caused to pivot together, thereby adjusting the angle of inclination of the top of the seat back relative to the bottom of the seat back.

Once this adjustment has been performed, the first end 11a of the torsion bar is prevented from rotating by the hinge mechanism 20 which is of the "non-reversible" type, i.e. it transmits rotary torque from the control shaft 23 to the moving side plate 22, but not in the opposite direction, as is well known in the state of the art.

Consequently, once the inclination of the upper structure 7 has been adjusted by means of the hinge mechanism 20, the frame of the seat proper operates in the same way as in the embodiment shown in FIGS. 1 to 3.

We claim:

1. A seatback frame for a vehicle seat, said frame having an upper portion mechanically connected with a seat belt, the frame comprising an upper structure mounted on a lower structure, the lower structure having at least first and second substantially vertical side uprights, the upper structure comprising both a horizontal torsion bar extending longitudinally between first and second ends respectively mounted on the first and second side uprights of the lower structure, and secondly a superstructure which is disposed above the torsion bar and which is secured at least to the second end of the torsion bar, the first end of the torsion bar being prevented from rotating relative to the first upright of the lower structure, and the second end of the torsion bar pivoting freely relative to the second upright of the lower structure, the superstructure of the upper structure comprising a portion situated adjacent to the second upright of the lower structure, the seat belt being mechanically connected with said portion of the superstructure and applying a rotary torque to said portion of the superstructure when said seat belt is itself subjected to a traction force, the torsion bar and the superstructure being dimensioned so as to deform plastically when the seat belt is subjected to a traction force exceeding a predetermined value, and the upper structure then exerting a resistive force on the seat belt of less than 3,500N.

2. A seatback frame according to claim 1, in which the seat belt is wound, at least in part, on a belt winder.

3. A seatback frame according to claim 1, in which the torsion bar of the upper structure is tubular in section.

4. A seatback frame according to claim 1, in which the superstructure of the upper structure comprises an arch having a top cross-member and two side branches which extend downwards from the top cross-member, to bottom ends which are secured to the two respective ends of the torsion bar.

5. A seatback frame according to claim 1, in which the first end of the torsion bar is rigidly fixed in permanent manner to the first upright of the lower structure.

6. A seatback frame according to claim 1, in which the lower structure extends to a top end and the superstructure of the upper structure extends upwards beyond said top end, said superstructure extending horizontally over substantially the entire width of the seatback frame, and the first end of the torsion bar being prevented from rotating relative to the first upright of the lower structure by means of a hinge mechanism for adjusting the inclination of the upper structure relative to the lower structure.

7. A vehicle seat including a seat back provided with a seatback frame according to claim 1, the seat belt of the seat having a plurality of anchor points with all of the anchor points of said belt being secured to the seat.

* * * * *